(12) United States Patent
Zhang et al.

(10) Patent No.: US 11,431,795 B2
(45) Date of Patent: Aug. 30, 2022

(54) METHOD, APPARATUS AND STORAGE MEDIUM FOR RESOURCE CONFIGURATION

(71) Applicant: BOE TECHNOLOGY GROUP CO., LTD., Beijing (CN)

(72) Inventors: Qian Zhang, Beijing (CN); Junjie Zhao, Beijing (CN); Jing Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/268,850

(22) PCT Filed: Aug. 21, 2019

(86) PCT No.: PCT/CN2019/101712
§ 371 (c)(1),
(2) Date: Feb. 16, 2021

(87) PCT Pub. No.: WO2020/038388
PCT Pub. Date: Feb. 27, 2020

(65) Prior Publication Data
US 2021/0218801 A1    Jul. 15, 2021

(30) Foreign Application Priority Data

Aug. 22, 2018 (CN) .......................... 201810962868.8

(51) Int. Cl.
*G06F 15/173* (2006.01)
*H04L 67/1074* (2022.01)

(52) U.S. Cl.
CPC ................ *H04L 67/1074* (2013.01)

(58) Field of Classification Search
CPC ................................................ H04L 67/1074
(Continued)

(56) References Cited

U.S. PATENT DOCUMENTS 6,684,244 B1 * 1/2004 Goldman ............ H04L 41/0893
370/395.21
8,108,232 B1 * 1/2012 Brandes ............... G06Q 10/063
705/7.11
(Continued)

FOREIGN PATENT DOCUMENTS

CN    103997506 A    8/2014
CN    105045611 A    11/2015
(Continued)

OTHER PUBLICATIONS

International Preliminary Report on Patentability received for PCT Patent Application No. PCT/CN2019/101712, dated Mar. 4, 2021, 11 pages (6 pages of English Translation and 5 pages of Original Document).
(Continued)

*Primary Examiner* — Alicia Baturay
(74) *Attorney, Agent, or Firm* — Womble Bond Dickinson (US) LLP (57) ABSTRACT

The present disclosure relates to a method, apparatus and storage medium for resource configuration. The method includes: receiving a request for resource creation, the request comprising a configuration rule for automatic configuration of a target resource; creating an automatic deployment resource in response to the request, wherein the automatic deployment resource includes configuration rule information derived from the configuration rule included in the request; and identifying the target resource to be configured and performing resource configuration for the identified target resource based on the configuration rule information. Thus, the efficiency of configuring a target resource is increased.

20 Claims, 7 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 8,566,838 | B2 * | 10/2013 | Sabin | G06F 9/5072 |
| | | | | 709/222 |
| 8,804,534 | B2 * | 8/2014 | Salam | H04L 69/40 |
| | | | | 370/242 |
| 8,935,429 | B2 * | 1/2015 | Wilkinson | H04L 67/10 |
| | | | | 709/219 |
| 8,984,113 | B2 * | 3/2015 | Li | H04W 4/70 |
| | | | | 709/224 |
| 9,106,561 | B2 * | 8/2015 | Jalan | H04L 47/125 |
| 9,113,322 | B2 * | 8/2015 | Garcia Azorero | H04W 4/70 |
| 9,246,953 | B2 * | 1/2016 | Maes | H04L 65/1069 |
| 9,256,424 | B1 * | 2/2016 | Kuchibhotla | G06F 8/71 |
| 9,419,917 | B2 * | 8/2016 | Eaton | H04L 47/785 |
| 9,665,366 | B2 * | 5/2017 | Kuchibhotla | H04W 4/60 |
| 9,716,634 | B2 * | 7/2017 | Sapuram | G06Q 30/0631 |
| 9,800,999 | B2 * | 10/2017 | Ahn | H04L 41/0893 |
| 9,910,706 | B2 * | 3/2018 | Cropper | G06F 9/50 |
| 9,921,820 | B2 * | 3/2018 | Kuchibhotla | H04L 67/10 |
| 10,104,011 | B2 * | 10/2018 | Sahoo | G06F 9/461 |
| 10,182,351 | B2 * | 1/2019 | Kim | H04L 67/12 |
| 10,318,265 | B1 * | 6/2019 | To | G06F 9/45558 |
| 10,374,911 | B2 * | 8/2019 | Ryu | H04L 43/04 |
| 10,379,990 | B2 * | 8/2019 | Krishnamoorthy | G06F 11/34 |
| 10,530,757 | B2 * | 1/2020 | Seed | H04L 67/142 |
| 10,728,253 | B2 * | 7/2020 | Seed | H04W 48/16 |
| 11,102,289 | B2 * | 8/2021 | Dai | H04L 67/1078 |
| 11,240,093 | B2 * | 2/2022 | Ly | G06F 9/5061 |
| 2004/0039815 | A1 * | 2/2004 | Evans | G06F 9/5066 |
| | | | | 709/225 |
| 2015/0074278 | A1 | 3/2015 | Maes et al. | |
| 2016/0358143 | A1 * | 12/2016 | Foti | G06Q 20/389 |
| 2017/0318023 | A1 | 11/2017 | Seed et al. | |
| 2018/0102934 | A1 * | 4/2018 | Ly | H04L 67/141 |
| 2021/0224134 | A1 * | 7/2021 | Glass | H04L 41/5041 |
| 2021/0227024 | A1 * | 7/2021 | Glass | G06F 9/5038 |

FOREIGN PATENT DOCUMENTS

| | | |
|---|---|---|
| CN | 105578444 A | 5/2016 |
| CN | 106406926 A | 2/2017 |
| CN | 107491321 A | 12/2017 |
| CN | 108337289 A | 7/2018 |
| WO | 2016/198911 A1 | 12/2016 |

OTHER PUBLICATIONS

International Search Report and Written Opinion received for PCT Patent Application No. PCT/CN2019/101712, dated Nov. 20, 2019, 13 pages (6 pages of English Translation and 7 pages of Original Document).

Office Action received for Chinese Patent Application No. 201810962868.8, dated Dec. 27, 2021, 12 pages (6 pages of English Translation and 6 pages of Office Action).

Supplementary European Search Report and Search Opinion received for EP Patent Application No. 19851759.1, dated Apr. 13, 2022, 8 pages.

* cited by examiner

METHOD, APPARATUS AND STORAGE MEDIUM FOR RESOURCE CONFIGURATION

RELATED APPLICATION

The present application is a 35 U.S.C. 371 national stage application of PCT International Application No. PCT/CN2019/101712, filed on Aug. 21, 2019, which claims the benefit of Chinese Patent Application for Invention No. 201810962868.8 filed on Aug. 22, 2018, the entire disclosures of which are incorporated herein as a part of the present disclosure by reference.

TECHNICAL FIELD

The present disclosure relates to the technical field of the Internet of Things (IoT), and more particularly to a method, apparatus and storage medium for resource configuration.

BACKGROUND

Currently, in the IoT, when a sub-resource is created for a target resource or an attribute of the target resource is configured, a request is initiated by an application layer to a service layer. The service layer inquires the target resource according to the request, obtains target resource information and returns it to the application layer. The application layer initiates a corresponding operation request (for example, a creation request, an update request, a deletion request, etc.) to the service layer according to the target resource information in order to, e.g., create a sub-resource for the target resource, update the attributes of the target resource and the like. When such an operation is to be performed on multiple target resources, the application layer needs to perform data interaction between every target resource and the service layer and carry out some related process individually each time. In response, the service layer also needs to perform a corresponding process, such as inquiry, each time. Such interaction occupies more bandwidth resources between the application layer and the service layer, and such a process causes greater pressure on the computing resources of the application layer and the service layer.

SUMMARY

According to an aspect of the present disclosure, there is provided a method for resource configuration. The method comprises receiving a request for resource creation, the request comprising a configuration rule for automatic configuration of a target resource; creating an automatic deployment resource in response to the request, wherein the automatic deployment resource includes configuration rule information derived from the configuration rule included in the request; and identifying the target resource to be configured and performing resource configuration for the identified target resource based on the configuration rule information.

In some embodiments, the configuration rule information comprises all configuration rules included in the configuration information. Alternatively, the configuration rule information comprises the configuration rule obtained by performing at least one of deletion, modification and addition operations for the configuration rules included in the request.

In some embodiments, the configuration rule information comprises identification information for identifying the target resource to be configured. The identification information comprises filter usage information. The identifying the target resource to be configured based on the configuration rule information comprises determining, based on the filter usage information, whether to identify the target resource using a filter criterion condition.

In some embodiments, the determining, based on the filter usage information, whether to identify the target resource using a filter criterion condition comprises using the filter criterion condition to identify the target resource when the filter usage information indicates filtering; and determining all the resources as target resources or using target resource matching information included in the configuration rule information to identify the target resource when the filter usage information indicates no filtering.

In some embodiments, the configuration rule information comprises identification information for identifying the target resource to be configured. The identification information comprises target resource matching information. The identifying the target resource to be configured comprises obtaining a target resource characteristic characterizing the target resource from the target resource matching information; and identifying the target resource based on the target resource characteristic.

In some embodiments, the target resource characteristic comprises one or more of a target resource type, a target resource label, and a target resource creator.

In some embodiments, the identifying the target resource based on the target resource characteristic comprises matching the characteristic of a selectable resource with the target resource characteristic, and determining the selectable resource whose characteristic matches the target resource characteristic as the target resource.

In some embodiments, the configuration rule information further comprises deployment information for defining how to perform automatic configuration. The deployment information comprises deployment type information and deployment operation information; and the performing resource configuration for the identified target resource comprises determining an object type to be deployed for the target resource based on the deployment type information; and performing a corresponding deployment operation on the object of the determined type based on the deployment operation information.

In some embodiments, the deployment information further comprises attribute configuration information. Automatic configuration of the identified target resource comprises configuring the corresponding attribute of the target resource based on the attribute configuration information and the deployment operation information when the deployment type information indicates the object type to be deployed as "attribute".

In some embodiments, the deployment information further comprises sub-resource configuration information. Automatic configuration of the identified target resource comprises configuring the corresponding sub-resource of the target resource based on the sub-resource configuration information when the deployment type information indicates the object type to be deployed as "sub-resource".

In some embodiments, the configuration rule information further comprises deployment information for defining how to perform automatic configuration, and the deployment information comprises configuration policy information; and the automatic configuration of the identified target resource comprises performing the resource configuration under the control of the configuration policy information.

In some embodiments, the target resource is at least one of a resource created before the creation of the automatic deployment resource or a resource newly created after the creation of the automatic deployment resource.

According to another aspect of the present disclosure, there is provided a method for resource configuration. The method comprises establishing a configuration rule for automatic configuration of a target resource; and sending a resource creation request comprising the configuration rule, the resource creation request being used to create an automatic deployment resource.

According to a further aspect of the present disclosure, there is provided an apparatus for resource configuration. The apparatus comprises a receiver arranged to receive a request for resource creation, the request comprising a configuration rule for automatic configuration of a target resource; and a resource creator arranged to create an automatic deployment resource in response to the request, wherein the automatic deployment resource includes configuration rule information derived from the configuration rule included in the request; and a resource configurator arranged to identify the target resource to be configured and perform resource configuration for the identified target resource based on the configuration rule information.

In some embodiments, the configuration rule information comprises identification information for identifying the target resource to be configured, and the identification information comprises filter usage information. The resource configurator is arranged to determine, based on the filter usage information, whether to identify the target resource to be configured using a filter criterion condition.

In some embodiments, the configuration rule information comprises identification information for identifying the target resource to be configured, and the identification information comprises target resource matching information. The resource configurator is arranged to obtain a target resource characteristic characterizing the target resource from the target resource matching information, and identify the target resource based on the target resource characteristic.

In some embodiments, the configuration rule information further comprises deployment information for defining how to perform automatic configuration, and the deployment information comprises deployment type information and deployment operation information. The resource configurator is arranged to determine an object type to be deployed for the target resource based on the deployment type information, and perform a corresponding deployment operation on the object of the determined type based on the deployment operation information.

In some embodiments, the deployment information further comprises attribute configuration information. The resource configurator is arranged to configure the corresponding attribute of the target resource based on the attribute configuration information and the deployment operation information when the deployment type information indicates the object type to be deployed as attribute.

In some embodiments, the deployment information comprises sub-resource configuration information. The resource configurator is arranged to configure the corresponding sub-resource of the target resource based on the sub-resource configuration information and the deployment operation information when the deployment type information indicates the object type to be deployed as sub-resource.

In some embodiments, the configuration rule information further comprises deployment information for defining how to perform automatic configuration, and the deployment information comprises configuration policy information. The resource configurator is arranged to perform the resource configuration under the control of the configuration policy information.

According to a further aspect of the present disclosure, there is provided an apparatus for resource configuration. The apparatus comprises a configuration information establisher arranged to establish a configuration rule for automatic configuration of a target resource; and a sender arranged to send a resource creation request comprising the configuration rule, the resource creation request being used to create an automatic deployment resource.

According to a further aspect of the present disclosure, there is provided a computing device for resource configuration. The computing device comprises a memory for storing an executable instruction; and a processor for executing the executable instruction to realize the steps of the method as described above.

According to a further aspect of the present disclosure, there is provided a computer storage medium. The computer storage medium is used to store computer-readable instructions that, when executed by a processor, cause a processor to perform the steps of the method as described above.

BRIEF DESCRIPTION OF DRAWINGS

The above and other features and advantages of the present disclosure will become more obvious after the embodiments are described in detail with reference to the drawings.

DETAILED DESCRIPTION

In the following description, for purposes of explanation instead of limitation, certain specific details of the disclosed embodiments, such as infrastructure, interfaces, technologies, are set forth in order to clearly and thoroughly understand the present disclosure. However, those skilled in the art should readily understand that the present disclosure may be implemented according to other embodiments that do not accurately conform to the details described herein without severely departing from the spirit and scope of the present disclosure. In addition, in this context, for the sake of simplicity and clarity, detailed description of familiar devices, circuits, and methods are omitted to avoid redundant details and possible confusion.

The IoT may be divided into a perception layer, a network layer, a service layer and an application layer. The perception layer is composed of various sensors. The sensors comprise sensing terminals such as infrared sensors, electronic labels, card readers, and inducers. The perception layer is used to identify objects and collect information in the IoT. The network layer is composed of various networks, including the Internet, a broadcasting and TV network, a network management system, a cloud computing platform, etc., which are responsible for delivering and processing information obtained by the perception layer. A large amount of information generated by the perception layer is transmitted and gathered to the service layer through the network layer. The service layer effectively integrates and utilizes the collected information. The application layer is the interface between the IoT and users, and is combined with industry needs to achieve intelligent application of the IoT.

According to the embodiments of the present disclosure, there is proposed a resource configuration approach for alleviating or mitigating problems in the related art. According to the resource configuration approach, an automatic deployment resource for automatic resource configuration may be set at the service layer. As such, the application layer only needs to initiate an operation request once to the service layer in order to complete the configuration operation for multiple target resources by means of the automatic deployment resource, thereby reducing the consumption of resources (including, e.g., bandwidth and computing resources) of the application layer and the service layer.

Figure 1:
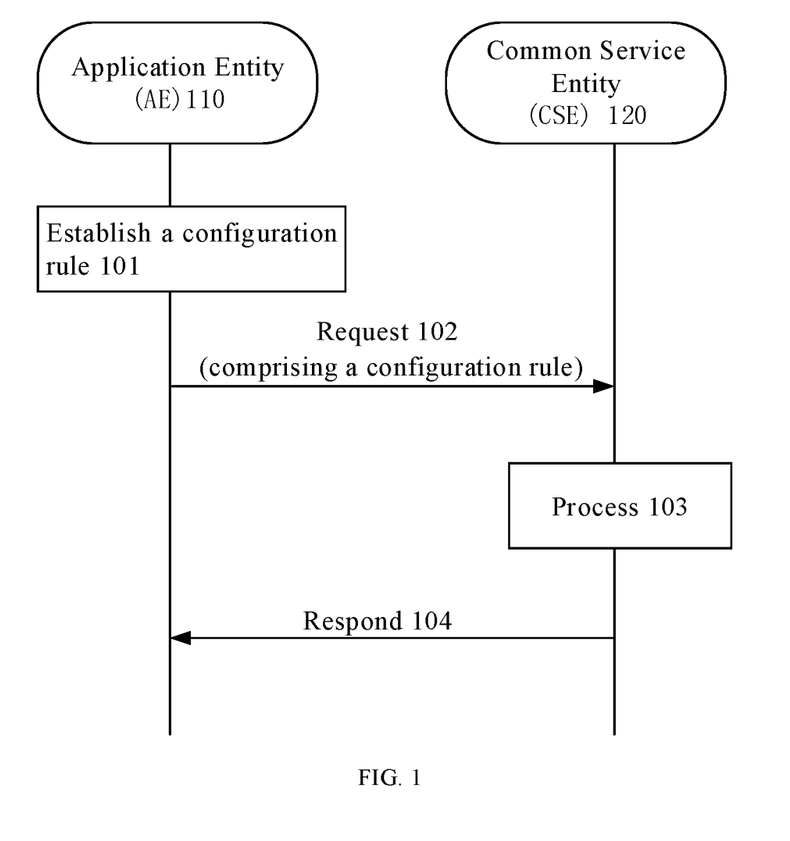
FIG. 1 is a schematic view of an environment in which an embodiment of the present disclosure is applicable.

FIG. 1 shows a schematic view of an environment in which an embodiment of the present disclosure is applicable. As shown in FIG. 1, the environment may comprise an Application Entity (AE) 110 and a Common Service Entity (CSE) 120.

The AE 110 may establish a configuration rule 101 for automatic configuration of a target resource. The configuration rule may be self-defined by the AE 110 and may comprise one or more rules indicating, e.g., configuration conditions and/or configuration requirements related to the automatic configuration.

After establishing the configuration rule, the AE 110 sends a resource creation request 102 to, e.g., the CSE 120. The resource creation request comprises the established configuration rule and optionally an instruction for creating an automatic deployment resource.

The CSE 120 processes 103 the received resource creation request. The CSE 120 may create an automatic deployment resource based on the resource creation request and use the automatic deployment resource for implementing resource configuration.

In some embodiments, the CSE 120 sends a resource creation response 104 to the AE 110 after the creation of the automatic deployment resource is completed. Optionally, the resource creation response 103 comprises details of how to create the resource.

Figure 2:
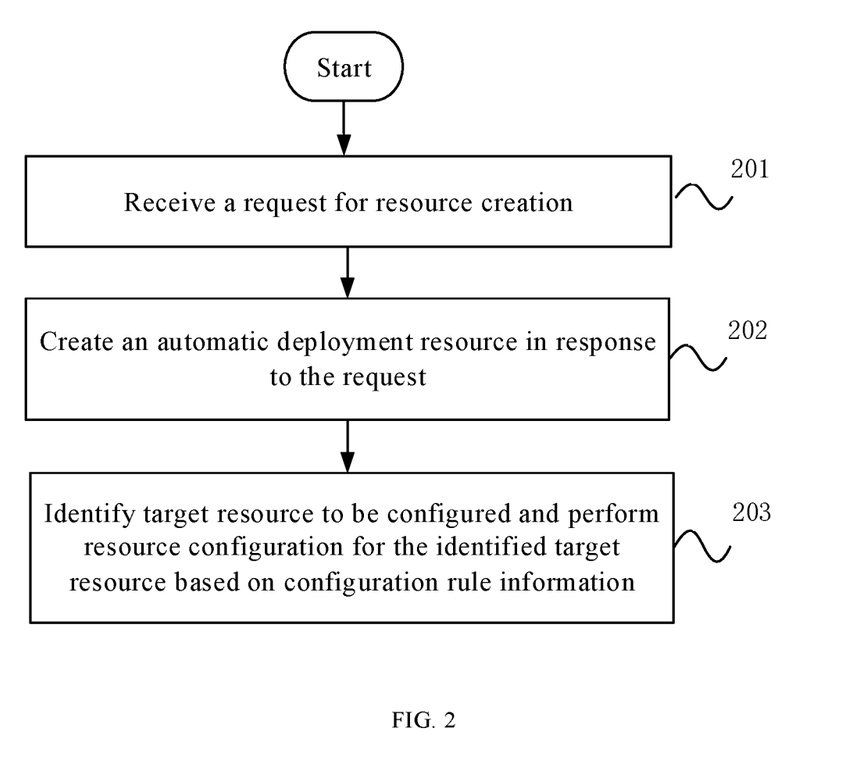
FIG. 2 is a schematic flowchart of an embodiment of a method of the present disclosure.

FIG. 2 is a schematic flowchart of an embodiment of a resource configuration method performed by a CSE according to the present disclosure.

At step 201, a request for resource creation is received, and the request comprises a configuration rule for automatic configuration of a target resource. The CSE may receive the request from the AE. The configuration rule may comprise one or more rules defined by the AE for governing or controlling the performance of the automatic configuration. The target resource may comprise resources representing AEs, containers, software, etc. in various devices and sensors.

At step 202, an automatic deployment (autoDeploy) resource is created in response to the request. Creation of the automatic deployment resource comprises storing configuration rule information in the automatic deployment resource, and the configuration rule information is derived from the configuration rule included in the request.

The automatic deployment resource is used for automatically configuring a resource(s). Automatic configuration may comprise operations such as automatic creation, update and deletion of an attribute and a sub-resource of the resource. The automatic deployment resource may be created in the application layer for a variety of application scenarios. In an example, if one and the same configuration operation is required to be performed on multiple resources simultaneously, the CSE may create the automatic deployment resource. In some embodiments, the automatic deployment resource may be created by the CSE according to a creation instruction received from the AE. The creation instruction may be input by a user or obtained from an entity that needs to perform a corresponding configuration operation.

After creating the automatic deployment resource, the CSE stores the configuration rule information in the automatic deployment resource. The configuration rule information specifies the rule that must be followed during automatic configuration of the resource. The configuration rule information may comprise various information, including, but not limited to, identification information for identifying a target resource to be configured and deployment information for defining how to perform automatic configuration. In some embodiments, the identification information may comprise, e.g., filter usage information and/or target resource matching information. The deployment information may comprise deployment type information, deployment operation information and the like. Furthermore, the deployment information may further comprise attribute configuration information, sub-resource configuration information, configuration policy information, and the like.

In some embodiments, the CSE extracts the configuration information and the configuration rule included therein from the received request, and makes the configuration rule information include all the extracted configuration rules. Alternatively or additionally, the CSE may include in the configuration rule information a part of these configuration rules as required. Optionally, the CSE may further include in the configuration rule information a modified version of the configuration rule. Optionally, the CSE may supplement the configuration rule information with other configuration rules than those included in the configuration information.

In one embodiment, the CSE may generate a self-attribute for the automatic deployment resource itself when creating the automatic deployment resource. The attribute value of the self-attribute is used to identify the characteristic, status and the like of the automatic deployment resource itself. The automatic deployment resource may have multiple self-attributes, such as the resource type, resource ID, resource name, resource expiration time, resource creation time, last resource modification time, resource declaration object, and resource declaration attributes. When the automatic deployment resource is created, a plurality of attributes may be selected therefrom with attribute values being set, for example, it is possible to set the resource type as 100 (representing that the resource type is an automatic deployment resource type), the resource ID as 12333, the resource name as autodeploy1, the resource expiration time as 20181020, is the resource creation time as 20180705, and the last resource modification time as 20180802.

In one embodiment, the configuration rule information may be embodied as a deployment-related attribute of the automatic deployment resource. Accordingly, when the automatic deployment resource is created, an attribute related to deployment (i.e., auto-configuration) of the automatic deployment resource is also generated. There may be multiple attributes related to deployment (i.e., auto-configuration), including, but not limited to, attributes related to target resource matching, attributes related to configuration operations, attributes related to configuration policies.

In one embodiment, after the configuration rule information is stored in the automatic deployment resource, the application layer sends the automatic deployment resource to the service layer to deploy the automatic deployment resource in the service layer and complete the resource configuration by means of the automatic deployment resource.

At step 203, the target resource to be configured is identified based on the configuration rule information and resource configuration is performed for the identified target resource.

Resource configuration may be done at the service layer. In some embodiments, the target resource to be configured may be identified based on the identification information in the configuration rule information, and the automatic configuration may be performed based on the deployment information in the configuration rule information. Automatic configuration of the target resource comprises operations such as creating, updating, and deleting an attribute and sub-resource of the target resource. In some embodiments, the target resource may comprise a resource that has been created before the creation of the automatic deployment resource or a resource that is newly created after the creation of the automatic deployment resource.

According to a method provided by the embodiments of the present disclosure, resource configuration of a target resource is performed by creating an automatic deployment resource, which reduces consumption of bandwidth resources between the application layer and the service layer, and reduces consumption of computing resources of the application layer and the service layer, thereby improving the efficiency of resource configuration.

Figure 3:
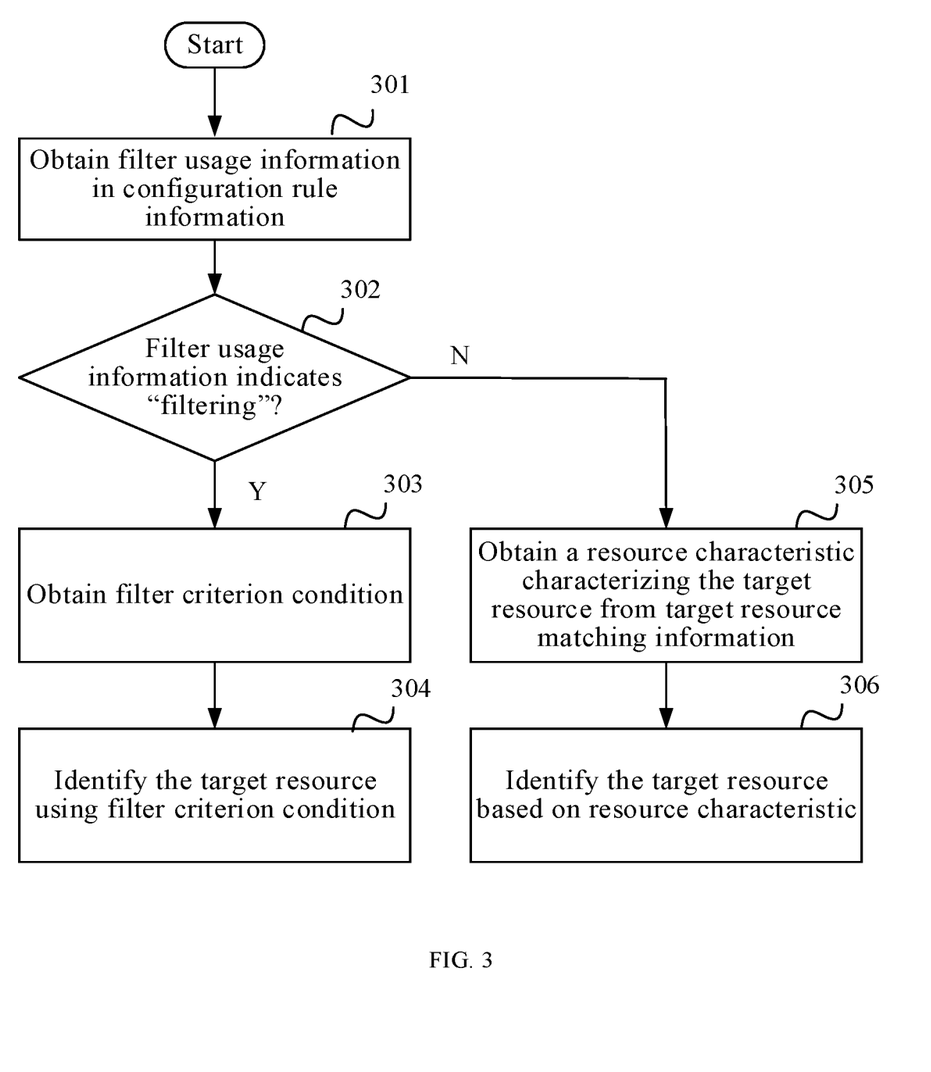
FIG. 3 is a schematic flowchart of another embodiment of a method of the present disclosure.

FIG. 3 is a schematic flowchart for identifying a target source to be configured according to an embodiment of the present disclosure. In the embodiment, the configuration rule information comprises identification information for identifying the target resource to be configured. The identification information comprises filter usage information. The filter usage information indicates whether to identify the target resource using a filter criterion condition. Exemplarily, the filter usage information may be stored as a filter usage (filterUsage) attribute in the automatic deployment resource.

At step 301, the filter usage information in the configuration rule information is obtained.

At step 302, determination is made on whether the filter usage information indicates filtering. Exemplarily, the attribute value of the filter usage attribute may be set to be "filtering" or "no filtering".

When the determination result indicates filtering, the filter criterion condition may be used to identify the target resource. In an example, at Step 303, the filter criterion condition may then be obtained. The filter criterion condition may be a pre-defined condition for selecting a target source. For example, the filter criterion condition may comprise a certain time before/after which the resource is created, a certain resource label, a certain sub-resource/parent-resource label, and the like.

At step 304, the target resource to be configured is identified based on the filter criterion condition. A resource that matches the filter criterion condition may be identified by comparing the filter criterion condition with a corresponding attribute(s) of the target resource, and the matching resource may be identified as the target resource. If the attribute value of the filter usage attribute is "no filtering", all available resources may be determined as the target resource.

In some embodiments, if the attribute value of the filter usage attribute is "no filtering", the target source may be identified by other identification information, such as target source matching information, included in the configuration rule information. According to these embodiments, the method described in FIG. 3 may alternatively or additionally comprise the following steps.

At step 305, a resource characteristic characterizing the target resource is obtained from the target resource matching information. In some embodiments, the target resource matching information may only indicate a type characteristic of the target resource. Alternatively, the target resource matching information may also simultaneously indicate one or more characteristics of a target resource type, a target resource label, and a target resource creator, and the like. The application layer may set up a data block for the target resource matching information. The data block may be several sets of records that are arranged consecutively in sequence. The data block may store one or more of the target resource type, target resource label, and target resource creator.

In some embodiments, the target resource matching information may exist in the automatic deployment resource in the form of an attribute of the automatic deployment resource. Attributes related to the target resource identification may comprise one or more of the target resource type (targetResourceType) attribute, the target resource label (targetResourceLabel) attribute, and the target resource creator (targetResourceCreator) attribute to respectively indicate the characteristics of the target resource to be configured. In some embodiments, the target resource label attribute and the target resource creator attribute may be optional.

At step 306, the target resource is identified based on the resource characteristic. The resource characteristic may comprise the target resource type. There may be many types of target resources, including, but not limited to, a software type, a container type and an AE type. The resource characteristic may also comprise the target resource label, the target resource creator, etc. The target resource label may be a target resource ID and the like. For example, when the resource characteristic is the resource type being "container", a resource of the container type is identified as the target resource. In another example, when the resource characteristic is the target resource creator being "A", all the resources created by "A" are identified as the target resource.

It can be understood that according to the embodiments of the present disclosure, the configuration rule information may comprise both the filter usage information and the target resource matching information, or either one of the filter usage information and the target resource matching information. On the occasion where the precise target resource match is required, it may be advantageous to use filter usage information to identify a target resource, since a filter criterion condition may define more characteristics of the target resource more finely. On the occasion where no precise target resource identification is required while a high response speed is required, it may be advantageous to use the target resource matching information that defines a key characteristic or category characteristic of a target resource in order to quickly identify the target resource.

Figure 4:
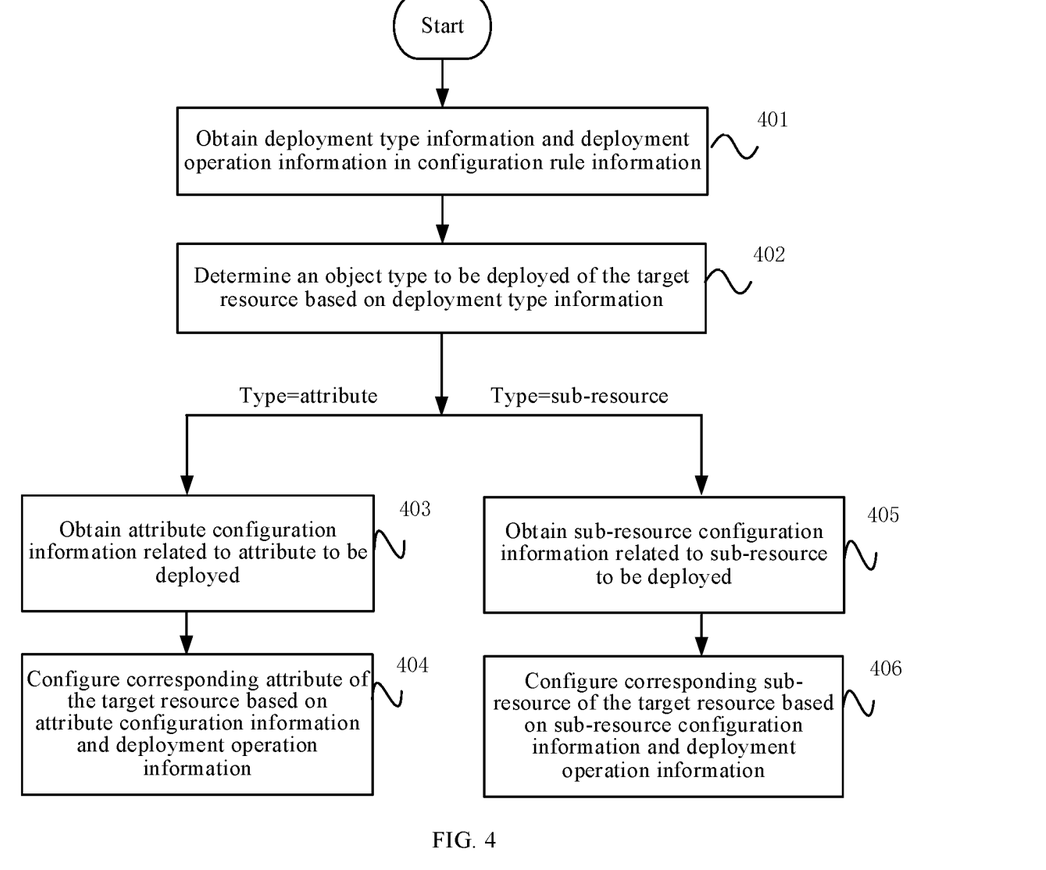
FIG. 4 is a schematic flowchart of another embodiment of a method of the present disclosure.

FIG. 4 is a schematic flowchart of automatically configuring an identified target source based on configuration rule information according to an embodiment of the present disclosure. The configuration rule information comprises deployment information of configuration parameters required for automatic configuration. The deployment information may comprise deployment type information and deployment operation information.

At step 401, the deployment type information and deployment operation information in the configuration rule information is obtained. The deployment type information indicates an object type to be deployed in the identified target resource, and the deployment operation information indicates an operation type performed on the target source.

At step 402, an object type to be deployed of the target resource is determined based on the deployment type information. In some embodiments, the deployment type information may be embodied as a deployment type (deployType) attribute in the automatic deployment resource. The deployment type attribute is used to represent a type of an object to be deployed. The type of the object comprises attribute, sub-resource and the like. For example, if the attribute value of the deployment type attribute is A, the type of the object to be deployed is attribute. If the attribute value of the deployment type attribute is B, the type of the object to be deployed is sub-resource.

A corresponding deployment operation is performed on an object of the determined type based on the deployment operation information so as to complete automatic configuration of the target resource. In some embodiments, the deployment operation information may be embodied as a deployment operation (deployOperation) attribute in the automatic deployment resource. The deployment operation attribute is used to represent a type of deployment operation. A type of deployment operation comprises creation, update, deletion, etc. A type of deployment operation may be indicated by different attribute values of the deploy operation attribute. For example, if the attribute value of the deployment operation attribute is C, the type of configuration operation is creation operation type. If the attribute value of the deployment operation attribute is U, the type of configuration operation is modification operation type. If the attribute value of the deployment operation attribute is D, the type of configuration operation is deletion operation type.

When the deployment type information indicates that an object type to be deployed is attribute, the configuration rule information may further comprise attribute configuration information. At this time, at Step 403, attribute configuration information related to the attribute to be deployed is obtained. The application layer may send a request message to the service layer to obtain the attribute configuration information. The service layer returns the attribute configuration information to the application layer after retrieving it. There may be multiple attributes of the target resource that need to be deployed, such as an access control policy ID (accessControlPolicyID) attribute and an access website address attribute. The attribute configuration information may comprise deployment attribute name information and deployment attribute value information. For example, the deployment attribute name may be a website that is downloadable and accessible, and the deployment attribute value may be a download address of new patch software.

At step 404, the corresponding attribute of the target resource is configured based on the attribute configuration information and the deployment operation information.

In some embodiments, the attribute configuration information may be embodied as a deployment attribute name (deployAttributeName) attribute and a deployment attribute value (deployAttributeValue) attribute in the automatic deployment resource. The application layer may be provided with the deployment attribute name attribute and the deployment attribute value attribute. The attribute values of the deployment attribute name attribute and the deployment attribute value attribute represent the deployment attribute name and the deployment attribute value, respectively.

In an exemplary scenario, it may be obtained from the automatic deployment resource that the attribute value of the deployment operation attribute is U (modification), and the attribute value of the deployment type attribute is A (attribute), which indicates that the attributes of the target resource need to be modified. To this end, the attribute value (e.g., a downloadable and accessible website) of the deployment attribute name attribute and the attribute value (the download address of new patch software) of the deployment attribute value attribute may be further obtained from the automatic deployment resource. Accordingly, an attribute modification message carrying attribute values of the deployment attribute name attribute and the deployment attribute value attribute in the automatic deployment resource may be sent to the target resource to modify the attributes of the target resource. The target resource modifies the attribute value of its own downloadable and accessible website attribute to the download address of the new patch software.

In some embodiments, when an attribute value of the deployment type attribute indicates that the type of the configuration operation object is a sub-resource, the configuration rule information may further comprise sub-resource configuration information.

At step 405, sub-resource configuration information related to the sub-resource to be deployed of the target resource is obtained. The application layer may send a request message to the service layer to obtain the sub-resource information to be deployed of the target resource, such as the sub-resource information to be created. The service layer retrieves the sub-resource information that needs to be created for the target resource and returns it to the application layer to generate sub-resource configuration information based on the sub-resource information to be deployed. The sub-resource information to be established for the target resource may be a list of IDs of sub-resources that need to be added to the target resource.

At step 406, the corresponding sub-resource of the target resource is configured based on the sub-resource configuration information and the deployment operation information. The sub-resource configuration information may be embodied as a deployment resource ID (deployResourceIDs) attribute in the automatic deployment resource. The application layer may set the deployment resource ID attribute. In one example, the attribute value of the deployment resource ID attribute may be used to indicate a list of IDs of sub-resources to be created/added for the target resource. The sub-resource configuration information comprises the attribute value of the deployment resource ID attribute.

The automatic deployment resource obtains the sub-resource configuration information in order to configure the corresponding sub-resources of the target resource, including creation, modification, deletion, etc. For example, the automatic deployment resource determines that the corresponding sub-resource of the target resource needs to be created based on the attribute values of the deployment operation attribute and the deployment type attribute. Thus, the automatic deployment resource obtains the attribute value of the deployment resource ID attribute, that is, the list of IDs of sub-resources to be added to the target resource. The automatic deployment resource determines a sub-resource corresponding to this list of IDs of sub-resources, creates or obtains the corresponding sub-resource, and adds the corresponding sub-resource to the target resource. In an exemplary scenario, the target resource is a main control platform for a vegetable greenhouse. The automatic deployment resource obtains the list of IDs of sub-resources that need to be added to the main control platform. There is only one sub-resource ID in the list of IDs, and the sub-resource corresponding to the sub-resource ID is an air-conditioning control assembly. Therefore, the automatic deployment resource may send a notification message to the air-conditioning control assembly and the main control platform after the sub-resource of the air-conditioning control assembly is created. The main control platform and air-conditioning control assembly exchange information, and finally an air-conditioning control assembly sub-resource is added under the of the main control platform resource.

Figure 5:
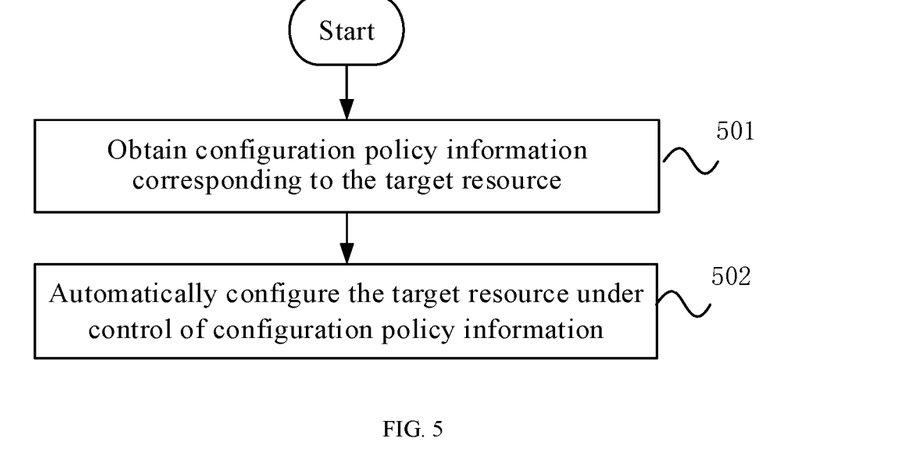
FIG. 5 is a schematic flowchart of another embodiment of a method of the present disclosure.

In some embodiments, an automatic deployment resource may also control a deployment operation according to a certain configuration policy. Therefore, configuration rule information also comprises configuration policy information. FIG. 5 is a schematic flowchart of controlling the deployment operation by using the configuration policy information according to an embodiment of the present disclosure.

At step 501, the configuration policy information corresponding to a target resource is obtained from the configuration rule information. In some embodiments, during a process of creating the automatic deployment resource, the application layer may send a request message to the service layer to obtain the configuration policy corresponding to the target resource. The service layer retrieves the configuration policy corresponding to the target resource and returns it to the application layer. The application layer adds the configuration policy information to the configuration rule information based on the configuration policy corresponding to the target resource. The configuration policy information may indicate a configuration effective decision rule. The configuration effective decision rule may be a time effective decision rule and the like.

In an exemplary scenario, the target resource is a main control platform for a vegetable greenhouse. The configuration policy of the main control platform may be set to perform the deployment operation between 21:00 and 23:00. Therefore, the configuration effective decision rule may be so set that an automatic configuration performed by the automatic deployment resource is valid between 21:00 and 23:00 every night.

At step 502: the target resource is automatically configured under the control of the configuration policy information.

In some embodiments, the configuration policy information may be embodied as an attribute related to the configuration policy in the automatic deployment resource, including, e.g., a deployment time attribute. The deployment time attribute comprises a first time (notDeployBefore) attribute used to set the start time of deployment (that is, the deployment operation is valid after this set time) and a second time (notDeployAfter) attribute used to set the end time of deployment (that is, the deployment operation is valid before this set time). The deployment operation effective decision rule may be identified by the first time attribute and the second time attribute. In some embodiments, the deployment time attribute may comprise both or either of the first time attribute and the second time attribute.

Exemplarily, the value of the first time attribute may be set to be 21:00, and the value of the second time attribute may be set to be 23:00. Thus, it may be determined that the automatic configuration may be automatically performed between 21:00 and 23:00 via the automatic deployment resource, that is, the main control platform may be configured between 21:00 and 23:00.

In one embodiment, a deployment record attribute is set in the automatic deployment resource to record information related to the resource that has been configured by the automatic deployment resource, including historical information of creating the sub-resource for the target resource or configuring the attribute of the target resource. The deployment record attribute may comprise a deployment count (deployCount) attribute and a deployment list (deployList) attribute. The deployment count attribute is used to indicate a count of resources that have been configured by the automatic deployment resource. The deployment list attribute is used to indicate a list of resources that have been configured by the automatic deployment resource, and the like.

Figure 6:
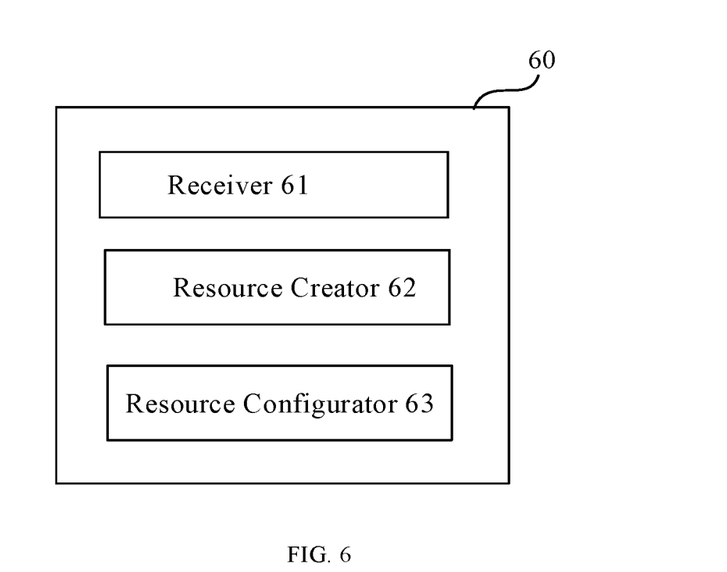
FIG. 6 is a structural block diagram of an embodiment of an apparatus of the present disclosure.

FIG. 6 is a schematic block diagram of an embodiment of a resource configuration apparatus according to the present disclosure. As shown in FIG. 6, the resource configuration apparatus 60 comprises a receiver 61, a resource creator 62, and a resource configurator 63. The receiver 61 is arranged to receive a request for resource creation, and the request comprises a configuration rule for automatic configuration of a target resource. The resource creator 61 is arranged to create an automatic deployment resource in response to the request. Configuration rule information included in the automatic deployment resource is derived from the configuration rule included in the request. The resource configurator 63 is arranged to identify the target resource to be configured and perform resource configuration for the identified target resource based on the configuration rule information. In an embodiment, the resource configuration apparatus 60 may be implemented as a CSE.

In one embodiment, the configuration rule information comprises resource identification information for identifying a target resource to be automatically configured. The resource identification information may comprise at least one of filter usage information and resource matching information. The configuration rule information may further comprise deployment information to indicate how to perform automatic configuration. The deployment information may comprise deployment type information and deployment operation information. Additionally, when the deployment type information indicates that the deployment type is attribute, the deployment information may further comprise attribute configuration information. The attribute configuration information may comprise an attribute name and an attribute value. When the deployment type information indicates that the deployment type is sub-resource, the deployment information may comprise sub-resource configuration information. The sub-resource configuration information may comprise a list of sub-resource identifiers. Additionally, the deployment information may comprise deployment policy information. The deployment policy information may comprise deployment effective time information.

In some embodiments, the resource configurator 63 may be arranged to determine, based on the filter usage information, whether to identify the target resource to be configured by using the filter criterion condition. Alternatively or additionally, the resource configurator 63 may be arranged to obtain a resource characteristic characterizing the target resource from the target resource matching information, and identify the target resource based on the resource characteristic.

In some embodiments, the resource configurator 63 may be arranged to determine an object type to be deployed for the target resource based on the deployment type information; and conduct the automatic configuration by performing a corresponding deployment operation on an object of the determined type based on the deployment operation information. When the deployment type information indicates the object type to be deployed is attribute, the resource configurator 63 may be arranged to configure the corresponding attribute of the selected target resource based on the attribute configuration information. When the deployment type information indicates the object type to be deployed is sub-resource, the resource configurator 63 may be arranged to configure the corresponding sub-resource based on the sub-resource configuration information.

In some embodiments, the resource configurator 63 may be arranged to perform the automatic configuration under the control of the configuration policy information. When the configuration policy information comprises an effective decision rule to indicate a time period during which the configuration is valid, the resource configurator 63 is arranged to perform the automatic configuration within the time period specified by the effective decision rule.

In some embodiments, the resource creator 61 is arranged to create the automatic deployment resource in the application layer and deploy it into the service layer. The resource configurator 63 is arranged to perform automatic configuration of the target resource in the service layer.

Figure 7:
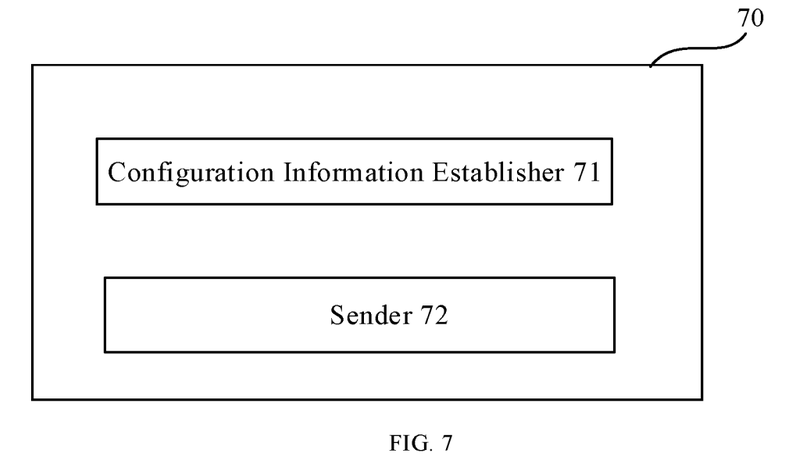
FIG. 7 is a structural block diagram of another embodiment of an apparatus of the present disclosure.

FIG. 7 is a schematic block diagram of another embodiment of the resource configuration apparatus 70 according to the present disclosure. As shown in FIG. 7, the resource configuration apparatus 70 comprises a configuration information establisher 71 and a sender 72. The configuration information establisher 71 is arranged to establish a configuration rule for automatic configuration of a target resource. The sender 72 is arranged to send a resource creation request comprising the configuration rule, and the resource creation request is used for creating an automatic deployment resource. In one embodiment, the resource configuration apparatus 70 is implemented as an AE.

Figure 8:
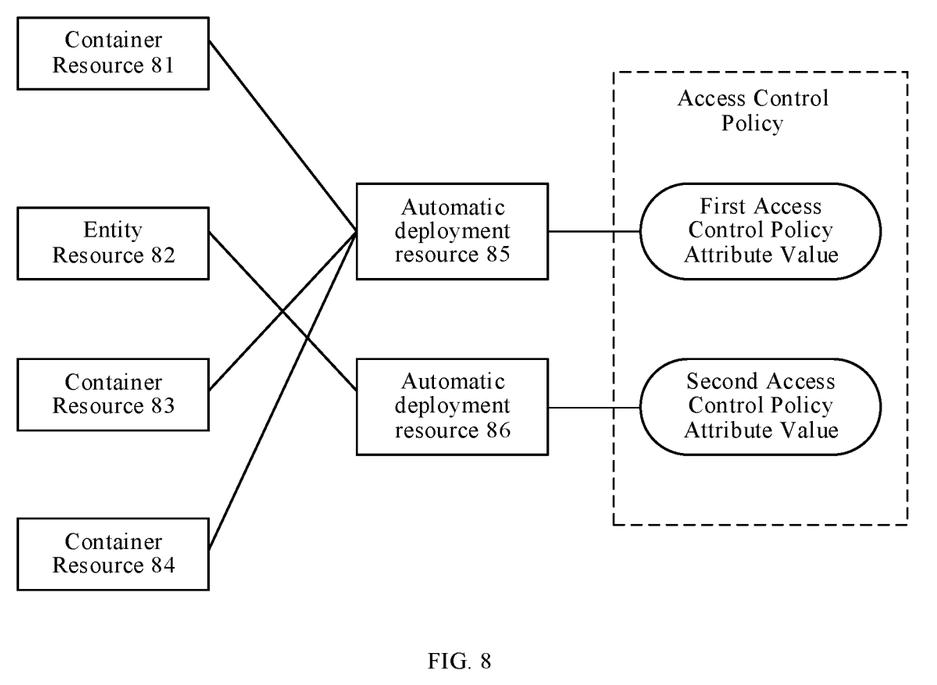
FIG. 8 is an exemplary scenario to which an embodiment of the present disclosure is applicable.

FIG. 8 shows an exemplary scenario to which an embodiment of the present disclosure is applicable. FIG. 8 shows six resources 81, 82, 83, 84, 85 and 86, where the resource type of the resources 81, 83 and 84 is container type and the resource type of the resource 82 is AE type. The resources 85 and 86 are automatic deployment resources created by the application layer and are sent to the service layer for deployment.

In this exemplary scenario, it is supposed that a suspected attacker A is crawling data of the IoT in order to obtain them. In order to secure the data, all container resources in the IoT need to be temporarily protected. Therefore, an access control policy that corresponds to the container resource is established for the attacker A (that is, the user A). The content of the access control policy may be that if a resource acquisition request initiated by the user A is received, it is blocked. This access control policy corresponds to a first access control policy attribute value.

In such a scenario, an automatic deployment resource 85 as below may be created. The configuration rule information stored in the automatic deployment resource 85 may only comprise a target resource type attribute, and the value of the target resource type attribute is set to be container type. At the same time, the attribute value of the deployment operation attribute in the configuration rule information stored by the automatic deployment resource 85 may be set to be C (i.e., creation), and the attribute value of the deployment type attribute is set to be A (i.e., attribute). The attribute configuration information in the configuration rule information stored by the automatic deployment resource 85 may comprise a deployment attribute name attribute and a deployment attribute value attribute, and the attribute value of the deployment attribute name attribute is set to be access control policy attribute, and the attribute value of the deployment attribute value attribute is set to be first access control policy attribute value.

In FIG. 8, for the sake of comparison, it may be supposed that the automatic deployment resource 86 is created differently. Exemplarily, configuration rule information stored by the automatic deployment resource 86 may only comprise a target resource type attribute, and the attribute value of the target resource type attribute identifies the target resource type as AE type. At the same time, in the configuration rule information stored by the automatic deployment resource 86, the attribute value of the deployment operation attribute is C and the attribute value of the deployment type attribute is A. The attribute configuration information in the configuration rule information stored by the automatic deployment resource 86 comprises a deployment attribute name attribute and a deployment attribute value attribute, and the attribute value of the deployment attribute name attribute is access control policy attribute, and the attribute value of the deployment attribute value attribute is second access control policy attribute value.

In this way, once the automatic deployment resource 85 and the automatic deployment resource 86 are created and deployed, they may be utilized for automatic configuration. When the automatic deployment resource 85 is used for the automatic configuration of resources, since the target resource type attribute in the automatic deployment resource 85 indicates the container type, container resources, i.e., the resources 81, 83, 84, may be identified as the target resources. For these target resources, the access control policy attribute will be created under each target resource based on the deployment operation attribute, deployment type attribute, deployment attribute name attribute and deployment attribute value attribute in the automatic deployment resource 85, and the attribute value of the access control policy attribute will be set to be the first access control policy attribute value. Alternatively, when the access control policy attribute has already existed in the target resource, the deployment operation may also be completed by adding the first access control policy attribute value in the access control policy IDs (accessControlPolicyIDs) of the resource 81, resource 83, and resource 84.

In this exemplary scenario, since the setting of the access control policy for the container resources may be quickly completed through the automatic deployment resource, effective and timely protection against attackers may be achieved.

It can be understood that when the automatic deployment resource 86 is used for resource configuration, a second access control policy may be added to the access control policy of the entity resource 82 according to the configuration rule information in the automatic deployment resource 86.

Figure 9:
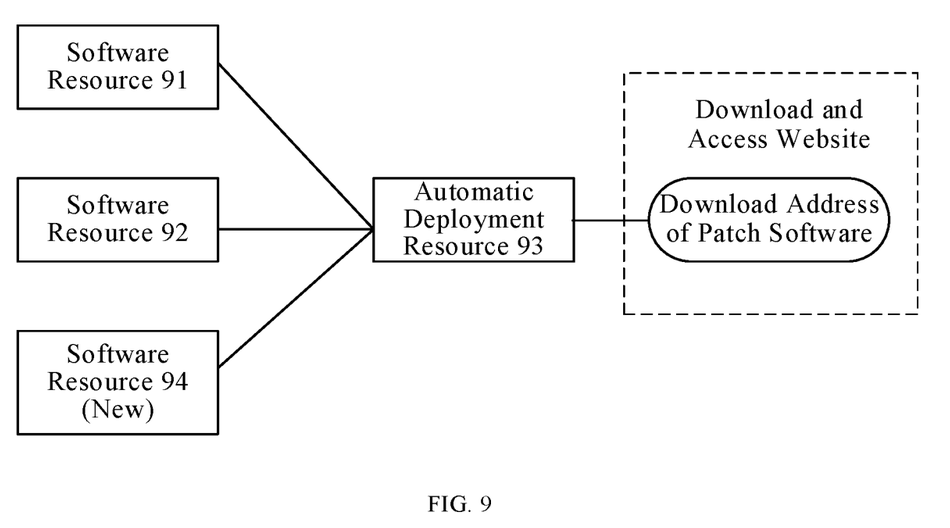
FIG. 9 is another exemplary scenario to which an embodiment of the present disclosure is applicable.

FIG. 9 shows another exemplary scenario to which an embodiment of the present disclosure is applicable. FIG. 9 shows four resources 91, 92, 93, and 94, wherein the resource types of the resources 91 and 92 are software type, the resource 93 is an automatic deployment resource, and the resource type of the resource 94 is also software type, but the resource 94 is created later than the resource 93. Each resource of software type is provided with a download and access website attribute, the attribute value of the download and access website attribute is a website, and the resource downloads a program from the website.

In the scenario shown in FIG. 9, suppose that a software virus outbreak is occurring, it is necessary to perform a unified patch and upgrade for software. To this end, an automatic deployment resource 93 may be created as follows. The target resource matching information in the configuration rule information stored in the automatic deployment resource 93 may only comprise the target resource type attribute, and the attribute value of the target resource type attribute identifies the deployment attribute name as software type. At the same time, in the configuration rule information stored in the automatic deployment resource 93, the attribute value of the deployment operation attribute may be set to be U (i.e., update), and the attribute value of the deployment type attribute may be set to be A (i.e., attribute). The attribute configuration information in the configuration rule information stored in the automatic deployment resource 93 may comprise the deployment attribute name attribute and the deployment attribute value attribute, and the deployment attribute name identified by the attribute value of the deployment attribute name attribute is set to be a download and access website, and the attribute value of the deployment attribute value attribute is set to be a download address of the new patch software.

In this way, when the automatic deployment resource 93 is used for automatic configuration of a resource(s), the resources 91 and 92 may be identified as target resources according to the configuration rule information in the automatic deployment resource 93, and the attribute values of the download and access website attributes of the resources 91 and 92 are respectively updated to the download address of the new patch software. As such, the resources 91 and 92 will download the patch based on the download address of the new patch software so as to upgrade.

In some embodiments, the automatic configuration may also be performed by means of the automatic deployment resource 93 in response to creation of the resource. In the scenario shown in FIG. 8, after the resources 91 and 92 have been automatically configured by the automatic deployment resource 93, a resource 94 is newly created and the resource type of the resource 94 is software type. At this time, after the resource 94 runs, the resource 94 may be automatically configured again by the automatic deployment resource 93. As stated above, the automatic configuration will cause the download and access website attribute of the resource 94 to be updated to the download address of the new patch software. As a result, the resource 94 will download the patch from the download address of the new patch software so as to upgrade.

In this exemplary scenario, because the automatic deployment resource 93 may enable each software resource to quickly download a new patch, the difficulty of patch and upgrade is reduced, and the response speed to virus is improved.

Figure 10:
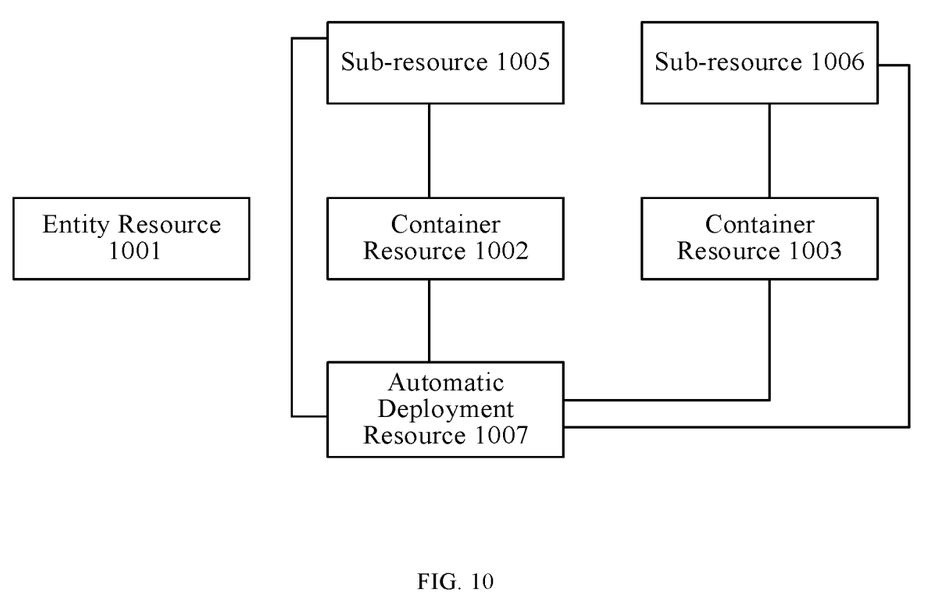
FIG. 10 is another exemplary scenario to which an embodiment of the present disclosure is applicable.

FIG. 10 shows an exemplary scenario to which an embodiment of the present disclosure is applicable. FIG. 10 shows seven resources 1001, 1002, 1003, 1004, 1005, 1006, and 1007, wherein the resource type of the resource 1001 is AE type, and the resource type of the resources 1002 and 1003 is container type. The resource 1007 is an automatic deployment resource.

In this exemplary scenario, suppose that a sub-resource needs to be created for a container-type resource. To this end, the application layer may send a request message to the service layer to obtain the sub-resource information of the sub-resource that the container resource needs to create. The service layer finds the sub-resource information and returns it to the application layer. The sub-resource information may comprise a list of IDs of the sub-resources to be created for the target resource.

In such a scenario, an automatic deployment resource 1007 as follows may be created. The configuration rule information stored in the automatic deployment resource 1007 may comprise a target resource type attribute, and the attribute value of the target resource type attribute is set to be a container type. At the same time, in the configuration rule information stored in the automatic deployment resource 1007, the attribute value of the deployment operation attribute may be C (i.e., creation), and the attribute value of the deployment type attribute may be B (i.e., sub-resource). The sub-resource configuration information in the configuration rule information stored in the automatic deployment resource 1007 may comprise the deployment resource ID attribute, and the attribute value of the deployment resource ID attribute is set to be the list of IDs of sub-resources that needs to be added.

In this way, when automatic configuration of resources is to be performed by using the automatic deployment resource 1007, the resources 1002 and 1003 may be identified as target resources according to the target resource type attribute of the automatic deployment resource 1007. Based on the deployment operation attribute, the deployment type attribute, and the deployment resource ID attribute of the automatic deployment resource 1007, the sub-resources 1005 and 1006 are respectively added to the resources 1002 and 1003 according to the list of IDs of sub-resources to be added. The resources 1005 and 1006 may be various types of resources, such as resources of AE type.

According to the embodiment of the present disclosure, the target resource is automatically configured by the automatic deployment resource, including automatic deployment of sub-resources or attributes, which reduces data interaction between the application layer and the service layer. This helps to reduce the consumption of bandwidth resources between the application layer and the service layer, save computing resources of the application layer and the service layer, and improve the efficiency of resource configuration. In addition, according to the solution of the embodiments of the present disclosure, complex configuration rules adapted to application scenarios or as actually required are established by the application layer, and the service layer only needs to perform simple matching/configuration according to the established configuration rules, thereby achieving an optimized architecture design.

Figure 11:
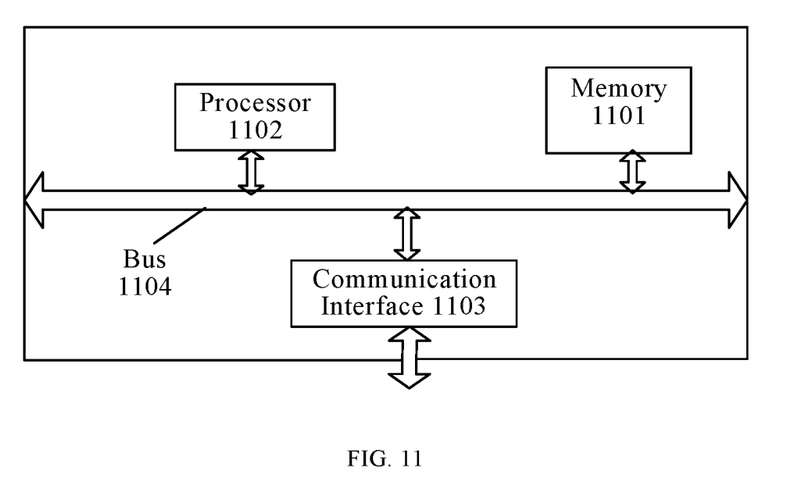
FIG. 11 is a structural block diagram of another embodiment of an apparatus of the present disclosure.

FIG. 11 is a structural schematic view of another embodiment of an apparatus according to the present disclosure. As shown in FIG. 11, the apparatus may be a computing device for resource configuration. The computing device may be, for example, a server of a service provider, a device associated with a client (e.g., a client device), a system on a chip, and/or any other suitable computing device or computing system.

The apparatus may comprise a memory 1101 and a processor 1102. The memory 1101 is configured to store an executable instruction. The processor 1102 is coupled to the memory 1101. The processor 1102 is arranged to execute the executable instruction to implement the resource configuration method of any one of the above embodiments.

The apparatus may further comprise a communication interface 1103 for exchanging information with other devices. At the same time, the apparatus may further comprise a bus 1104. The processor 1102, the communication interface 1103, and the memory 1101 may communicate with each other through the bus 1104.

The memory 1101 represents a memory/storage device capacity associated with one or more computer-readable media. The memory 1101 may comprise various types of memory units, such as a read-only memory (ROM), a random access memory (RAM), a dynamic RAM (DRAM), a dual data rate DRAM (DDRAM), a synchronous DRAM (SDRAM), a static RAM (SRAM), a programmable ROM (PROM), an erasable programmable ROM (EPROM), an electrically erasable programmable ROM (EEPROM), a flash memory, a polymer memory (such as a ferroelectric polymer memory, an ovonic memory, a phase-change or ferroelectric memory, a silicon-oxygen-nitrogen-oxygen-silicon (SONOS) memory), a magnetic card or optical card, and any other type of media suitable for storing information.

The processor 1102 may be a central processing unit CPU. The processor 1102 may also comprise a dedicated integrated circuit implemented in hardware or other logic means formed of one or more semiconductors. Such hardware units are not limited by the materials from which they are formed or the processing mechanisms employed therein. For example, the processor 1102 may comprise a semiconductor(s) and/or a transistor(s) (e.g., an electronic integrated circuit (IC)).

In an embodiment, the present disclosure provides a computer-readable storage medium. Examples of a computer-readable storage medium may comprise one or more types of storage media capable of storing electronic data, including a volatile or non-volatile memory, a removable or non-removable memory, an erasable or non-erasable memory, a writable or rewritable memory, etc. The computer-readable storage medium stores a computer instruction that, when executed by a processor, causes the processor to implement the resource configuration method in any one of the above embodiments.

According to a resource configuration solution of the embodiments of the present disclosure, an automatic deployment resource is created for automatic deployment/configuration of a target resource, which reduces the requirement for interaction between the application layer and the service layer, and thereby saves communication resources and processing resources. At the same time, because the operation is simple and convenient, the efficiency of configuring a target resource is enhanced, so that operating costs can be decreased and user experience be improved.

Generally, any of the functions described herein can be implemented using software, firmware, hardware (e.g., fixed logic circuitry system), manual processing, or a combination of these implementations. The terms "module", "functionality" and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Although the present disclosure has been described in connection with various exemplary embodiments, those of ordinary skill in the art will understand that many modifications can be made thereto within the scope of the appended claims. Therefore, the scope of the present disclosure is not limited to the above description in any way, but should be determined with full reference to the appended claims.

The invention claimed is:

1. A method for resource configuration, comprising:
   receiving a request for resource creation, the request comprising a configuration rule for automatic configuration of a target resource;
   creating an automatic deployment resource in response to the request and storing configuration rule information derived from the configuration rule included in the request in a created automatic deployment resource, the configuration rule information specifying a rule that is to be followed during the automatic configuration of the target resource and including identification information for identifying the target resource to be configured and deployment information for defining how to perform the automatic configuration of the target resource; and
   identifying the target resource to be configured based on the identification information in the configuration rule information and performing resource configuration for the identified target resource based on the deployment information in the configuration rule information by using the created automatic deployment resource.

2. The method according to claim 1, wherein the identification information comprises filter usage information; and
   the identifying the target resource to be configured based on the configuration rule information comprises determining, based on the filter usage information, whether to identify the target resource using a filter criterion condition.

3. The method according to claim 2, wherein the determining, based on the filter usage information, whether to identify the target resource using a filter criterion condition comprises:
   using the filter criterion condition to identify the target resource when the filter usage information indicates filtering; and
   determining all the resources as target resources or using target resource matching information included in the configuration rule information to identify the target resource when the filter usage information indicates no filtering.

4. The method according to claim 1, wherein the identification information comprises target resource matching information, and the identifying the target resource to be configured comprises:
   obtaining a target resource characteristic characterizing the target resource from the target resource matching information; and
   identifying the target resource based on the target resource characteristic.

5. The method according to claim 4, wherein the target resource characteristic comprises one or more of a group consisting of a target resource type, a target resource label, and a target resource creator; and the identifying the target resource based on the target resource characteristic comprises matching a characteristic of an selectable resource with the target resource characteristic, and determining the selectable resource whose characteristic matches the target resource characteristic as the target resource.

6. The method according to claim 1, wherein the deployment information comprises deployment type information and deployment operation information; and the performing resource configuration for the identified target resource comprises:

determining an object type to be deployed for the target resource based on the deployment type information; and performing a corresponding deployment operation on an object of a determined object type based on the deployment operation information.

7. The method according to claim 6, wherein the deployment information further comprises attribute configuration information; and the performing resource configuration for the identified target resource comprises:

configuring a corresponding attribute of the target resource based on the attribute configuration information and the deployment operation information when the deployment type information indicates the object type to be deployed as attribute.

8. The method according to claim 6, wherein the deployment information further comprises sub-resource configuration information; and the performing resource configuration for the identified target resource comprises:

configuring a corresponding sub-resource of the target resource based on the sub-resource configuration information when the deployment type information indicates the object type to be deployed as sub-resource.

9. The method according to claim 1, wherein the deployment information comprises configuration policy information, and the automatic configuration of the identified target resource comprises performing the resource configuration under control of the configuration policy information.

10. The method according to claim 1, wherein the receiving a request for resource creation comprising receiving the request from a first entity, and the configuration rule is established by the first entity.

11. A computing device for resource configuration, comprising a memory for storing an executable instruction; and a processor for executing the executable instruction to realize the steps of the method according to claim 1.

12. A non-transitory computer storage medium for storing computer-readable instructions that, when executed by a processor, cause a processor to perform the steps of the method according to claim 1.

13. An apparatus for resource configuration, comprising:
a receiver arranged to receive a request for resource creation, the request comprising a configuration rule for automatic configuration of a target resource; and
a resource creator arranged to create an automatic deployment resource in response to the request and store configuration rule information derived from the configuration rule included in the request in a created automatic deployment resource, the configuration rule information specifying a rule that is to be followed during the automatic configuration of the target resource and including identification information for identifying the target resource to be configured and deployment information for defining how to perform the automatic configuration of the target resource; and
a resource configurator arranged to identify the target resource to be configured based on the identification information in the configuration rule information and perform resource configuration for the identified target resource based on the deployment information in the configuration rule information by using the created automatic deployment resource.

14. The apparatus according to claim 13, wherein the identification information comprises filter usage information and the resource configurator is arranged to determine, based on the filter usage information, whether to identify the target resource to be configured using a filter criterion condition.

15. The apparatus according to claim 13, wherein the identification information comprises target resource matching information; and the resource configurator is arranged to obtain a target resource characteristic characterizing the target resource from the target resource matching information, and identify the target resource based on the target resource characteristic.

16. The apparatus according to claim 13, wherein the deployment information comprises deployment type information and deployment operation information, and the resource configurator is arranged to determine an object type to be deployed for the target resource based on the deployment type information, and perform a corresponding deployment operation on an object of a determined type based on the deployment operation information.

17. The apparatus according to claim 16, wherein the deployment information comprises attribute configuration information, and the resource configurator is arranged to configure a corresponding attribute of the target resource based on the attribute configuration information and the deployment operation information when the deployment type information indicates the object type to be deployed as attribute.

18. The apparatus according to claim 16, wherein the deployment information comprises sub-resource configuration information; and the resource configurator is arranged to configure a corresponding sub-resource of the target resource based on the sub-resource configuration information and the deployment operation information when the deployment type information indicates the object type to be deployed as sub-resource.

19. The apparatus according to claim 13, wherein the deployment information comprises configuration policy information, and the resource configurator is arranged to perform the resource configuration under control of the configuration policy information.

20. An apparatus for resource configuration, comprising:
a configuration information establisher arranged to establish a configuration rule for automatic configuration of a target resource; and
a sender arranged to send a resource creation request comprising the configuration rule, wherein the resource creation request is used for creating an automatic deployment resource so as to identify a target resource to be configured based on identification information in configuration rule information and perform resource configuration for an identified target resource based on deployment information in the configuration rule information by using a created automatic deployment resource, wherein the configuration rule information is derived from the configuration rule included in the resource creation request and specifies a rule that is to be followed during the automatic configuration of the identified target resource.

\* \* \* \* \*